(12) United States Patent
Zhang et al.

(10) Patent No.: US 12,481,307 B2
(45) Date of Patent: Nov. 25, 2025

(54) OPTICAL COMPUTING DEVICE AND OPTICAL SIGNAL PROCESSING METHOD

(71) Applicant: Huawei Technologies Co., Ltd., Shenzhen (CN)

(72) Inventors: Xiang Zhang, Shenzhen (CN); Zhiqiang Yun, Shenzhen (CN); Xiaowen Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 853 days.

(21) Appl. No.: 17/827,249

(22) Filed: May 27, 2022

(65) Prior Publication Data
US 2022/0350361 A1 Nov. 3, 2022

Related U.S. Application Data

(63) Continuation of application No. PCT/CN2021/070719, filed on Jan. 7, 2021.

(30) Foreign Application Priority Data

Nov. 30, 2019 (CN) .......................... 201911209007.3

(51) Int. Cl.
*G06E 3/00* (2006.01)
*G02F 1/21* (2006.01)
(Continued)

(52) U.S. Cl.
CPC .............. *G06E 3/008* (2013.01); *G02F 1/212* (2021.01); *G02F 1/392* (2021.01); *G02F 1/395* (2013.01);
(Continued)

(58) Field of Classification Search
CPC ......... G06E 3/008; G06E 3/005; G06E 1/045; G06E 3/006; G06E 3/003; G06E 1/00;
(Continued)

(56) References Cited

U.S. PATENT DOCUMENTS

| | | |
|---|---|---|
| 2014/0046626 A1 | 2/2014 | Yamamoto et al. |
| 2014/0200689 A1 | 7/2014 | Utsunomiya et al. |

(Continued)

FOREIGN PATENT DOCUMENTS

| | | |
|---|---|---|
| CN | 105186273 A | 12/2015 |
| CN | 108027545 A | 5/2018 |

(Continued)

OTHER PUBLICATIONS

Marandi, Alireza, et al. "Network of Time-Multiplexed Optical Parametric Oscillators as a Coherent Ising Machine." arXiv.Org, Jul. 10, 2014, arxiv.org/abs/1407.2871. (Year: 2014).*

(Continued)

*Primary Examiner* — George G. King
*Assistant Examiner* — Natasha Nigam
(74) *Attorney, Agent, or Firm* — Conley Rose, P.C.

(57) ABSTRACT

An optical computing device includes a parametric oscillator array, an interaction computing matrix, a first feedback system coupled to two ends of the parametric oscillator array, and a second feedback system coupled to the parametric oscillator array and the interaction computing array. The parametric oscillator array is configured to receive a first group of signals, and generate a first group of optical signals including a plurality of first optical signals. The interaction computing array is configured to receive the first group of optical signals, and perform matrix operation on the first group of optical signals. The first feedback system is configured to receive the first group of optical signals, and transmit the first group of optical signals to the parametric oscillator array. The second feedback system is configured to receive the second group of optical signals, and transmit the second group of optical signals to the parametric oscillator array.

16 Claims, 8 Drawing Sheets

(51) Int. Cl.
*G02F 1/39* (2006.01)
*G06F 17/16* (2006.01)
*G06F 17/11* (2006.01)

(52) U.S. Cl.
CPC .............. *G06E 3/001* (2013.01); *G06F 17/16* (2013.01); *G06F 17/11* (2013.01)

(58) Field of Classification Search
CPC ......... G06E 3/001; G02F 1/212; G02F 3/024; G02F 1/00; G02F 2203/15; G02F 1/0018; G02F 1/39; G02F 1/392
See application file for complete search history.

(56) References Cited

U.S. PATENT DOCUMENTS

| | | |
|---|---|---|
| 2016/0162798 A1 | 6/2016 | Marandi et al. |
| 2017/0024658 A1 | 1/2017 | Utsunomiya et al. |
| 2018/0157775 A1 | 6/2018 | Ronagh et al. |
| 2018/0246393 A1 | 8/2018 | Inagaki et al. |
| 2019/0019100 A1 | 1/2019 | Roques-Carmes et al. |
| 2021/0088873 A1 | 3/2021 | Inagaki et al. |

FOREIGN PATENT DOCUMENTS

| | | |
|---|---|---|
| JP | 2015163922 A | 9/2015 |
| JP | 2016528611 A | 9/2016 |
| JP | 2019028132 A | 2/2019 |
| WO | 2012118064 A1 | 9/2012 |
| WO | 2019078354 A1 | 4/2019 |

OTHER PUBLICATIONS

Yoshitomo Okawachi, Mengjie Yu, Kevin Luke, Daniel O. Carvalho, Michal Lipson, and Alexander L. Gaeta, "Quantum random number generator using a microresonator-based Kerr oscillator," Opt. Lett. 41, 4194-4197 (2016) (Year: 2016).*

L. Chang, et al., Heterogeneous integration of lithium niobate and silicon nitride waveguides for wafer-scale photonic integrated circuits on silicon, Optics Letters, vol. 42, No. 4, Feb. 15, 2017, 4 pages.

A. W. Elshaari, et al., On-chip single photon filtering and multiplexing in hybrid quantum photonic circuits, Nature Commun., 8, 379, 2017, 8 pages.

M He, et al., High performance hybrid silicon and lithium niobate Mach-Zehnder modulators for 100Gbit/s and beyond, Nat. Photonics, 2019, 7 pages.

* cited by examiner

OPTICAL COMPUTING DEVICE AND OPTICAL SIGNAL PROCESSING METHOD

CROSS-REFERENCE TO RELATED APPLICATIONS

This is a continuation of International Patent Application No. PCT/CN2021/070719 filed on Jan. 7, 2021 which claims priority to Chinese Patent Application No. 201911209007.3 filed on Nov. 30, 2019. The disclosures of the aforementioned applications are hereby incorporated by reference in their entireties.

TECHNICAL FIELD

This disclosure relates to the field of information technologies, and in particular, to an optical computing device and an optical signal processing method.

BACKGROUND

A non-deterministic polynomial hard (NP-hard) problem such as analysis and optimization of a complex system may be mapped into an Ising model, and an optical Ising machine is used to simulate and solve the Ising model to obtain a solution of the NP-hard problem.

The optical Ising machine uses a lattice network composed of a plurality of optical signals to simulate and solve the Ising model. Currently, in an implementation, the optical Ising machine is implemented by using a fiber system. Further, all input optical signals required for computing by the optical Ising machine are input in series. Then, all the input optical signals are circulated in a fiber cavity, and small parts of the input optical signals are coupled for matrix operation in a field-programmable gate array (FPGA). In this way, a coupling function between nodes in the Ising model is simulated, and an operation result is fed back to an input end of the optical Ising machine to implement interaction with all the input optical signals. Resulted optical signals serve as next input optical signals. The foregoing process is repeatedly performed to obtain an optimal solution of the optical Ising machine.

Because all the input optical signals required for computing are input to the optical Ising machine, the optimal solution obtained by using the optical Ising machine is a global optimal solution rather than a local optimal solution, thereby ensuring computing precision of the optical Ising machine. However, in the optical Ising machine, the input optical signals are run in series. When a quantity of nodes in the Ising model is large, a relatively large quantity of input optical signals needs to be introduced. As a result, a transmission time of the input optical signals in the optical Ising machine is increased. This greatly increases an operation time, and limits operation efficiency of the optical Ising machine.

Therefore, how to improve operation efficiency of an optical Ising machine while ensuring computing precision is an urgent problem to be resolved.

SUMMARY

This disclosure provides an optical computing device and an optical signal processing method, so as to provide an optical Ising machine with high computing precision and high operation efficiency.

According to a first aspect, an optical computing device is provided. The optical computing device includes a parametric oscillator array, an interaction computing matrix connected to the parametric oscillator array, a first feedback module connected to two ends of the parametric oscillator array, and a second feedback module connected to the parametric oscillator array and the interaction computing array. A working principle of the optical computing device is as follows.

The parametric oscillator array is configured to receive a first group of signals, and generate, based on the received first group of signals, a first group of optical signals including a plurality of first optical signals. The interaction computing array is configured to receive the first group of optical signals, and perform matrix operation on the first group of optical signals based on a preset matrix to obtain a second group of optical signals including a plurality of second optical signals. The first feedback module is configured to receive the first group of optical signals, and transmit the first group of optical signals to the parametric oscillator array. The second feedback module is configured to receive the second group of optical signals, and transmit the second group of optical signals to the parametric oscillator array.

In the foregoing optical computing device, the parametric oscillator array and the interaction computing matrix perform parallel processing processes on a plurality of optical signals included in one group of optical signals. Therefore, even if a quantity of nodes in an Ising model is relatively large, and a relatively large quantity of input optical signals need to be introduced, an operation time of the optical computing device does not increase.

Further, the optical signals generated by the parametric oscillator array are fed back to the parametric oscillator array to perform next computing. States of the optical signals generated by the parametric oscillator array can be increased, so that the optical computing device can obtain input optical signals in all possible states required for computing. This can prevent the optical computing device from obtaining a non-locally-optimal solution. That is, computing precision of the optical computing device is improved in a hardware annealing manner.

In a possible design, the parametric oscillator array is further configured to receive the first group of optical signals and the second group of optical signals, and output a third group of optical based on the first group of signals, the first group of optical signals, and the second group of optical signals. The interaction computing array is further configured to receive the third group of optical signals, and perform matrix operation on the third group of optical signals based on the preset matrix to obtain a fourth group of optical signals. The first feedback module is further configured to receive the third group of optical signals, and transmit the third group of optical signals to the parametric oscillator array. The second feedback module is further configured to receive the fourth group of optical signals, and transmit the fourth group of optical signals to the parametric oscillator array.

In the foregoing optical computing device, after receiving the optical signals transmitted by the first feedback module and the second feedback module, the parametric oscillator array may generate, with reference to the first group of signals and the optical signals transmitted by the first feedback module and the second feedback module, input signals used for computing.

In a possible design, the parametric oscillator array includes a plurality of parametric oscillators, the parametric oscillator includes a first waveguide and a second waveguide, a material of the first waveguide is different from that of the second waveguide, and the material of the first waveguide includes a material having a nonlinear effect.

In the foregoing optical computing device, the parametric oscillators in the parametric oscillator array may be integrated by using waveguides, so that the optical computing device can have a more compact structure. In addition, the first waveguide is a waveguide having a nonlinear effect, for example, may be a lithium niobate waveguide or a lithium tantalate waveguide that has second-order nonlinearity. The second waveguide may be a waveguide having a feature of a low transmission loss, for example, may be a silicon nitride waveguide, or may be silicon or silicon dioxide. Optical signals in a compressed state may be generated by using the nonlinear effect of the first waveguide. The optical signals in the compressed state may be understood as the input optical signals in all the possible states required for computing, and the generated optical signals in the compressed state are transmitted by using the second waveguide having the feature of a low transmission loss. This can prevent the optical computing device from obtaining a non-locally-optimal solution. Feature advantages of different waveguide materials are combined in a heterogeneous integration manner, and computing precision of the optical computing device can be ensured.

In a possible design, the material of the second waveguide includes a material whose transmission loss is less than a threshold.

In this way, a loss of the optical signals during transmission in the second waveguide can be reduced, and accuracy of the optical signals can be ensured.

In a possible design, the interaction computing array includes a plurality of cascaded Mach-Zehnder (MZ) interferometer units, each MZ interferometer unit includes a plurality of Mach-Zehnder interferometers (MZIs) and a plurality of beam splitters, each MI includes a waveguide whose dielectric constant adjustment speed is less than a threshold, and the waveguide is configured to adjust a phase parameter of the corresponding MZI.

Because a size of the Mach-Zehnder interferometer unit is relatively small, an optical computing device having a compact structure can be formed. Further, the optical computing device can be implemented on a chip, thereby ensuring system stability. Moreover, the MI is formed by using a material whose dielectric constant adjustment speed is less than the threshold. A phase parameter of the MI can be loaded and refreshed relatively quickly, thereby ensuring operation efficiency of the optical computing device.

In a possible design, waveguides in the plurality of MZIs included in a same MZ interferometer unit have different materials.

The MZI formed through heterogeneous integration can quickly load and refresh its phase parameter. This can implement quick loading and refreshing of the interaction computing matrix, thereby further improving the operation efficiency of the optical computing device.

In a possible design, the parametric oscillator further includes an optical splitter, connected to the parametric oscillator, the first feedback module, and the interaction computing array. The optical splitter is configured to receive one optical signal in the first group of optical signals, split the optical signal into a first part of optical signal and a second part of optical signal based on a preset split ratio, and transmit the first part of optical signal to the first feedback module, and transmit the second part of optical signal to the interaction computing matrix.

The optical splitter can flexibly control energy of the optical signal transmitted to the first feedback module and the interaction computing matrix, thereby increasing system flexibility.

In a possible design, the parametric oscillator further includes a beam combiner, connected to the parametric oscillator, the first feedback module, and the second feedback module. The beam combiner is configured to combine one optical signal in the first group of optical signals with one optical signal in the second group of optical signals into one optical signal, and transmit the optical signal obtained through beam combination to the parametric oscillator.

The beam combiner is used to combine a plurality of signals into one signal for processing. This can reduce a computing amount of the parametric oscillator.

According to a second aspect, this disclosure provides an optical signal processing method. For beneficial effects, refer to related descriptions in the first aspect. Details are not described herein again. The method is performed by an optical computing device. The optical computing device includes a parametric oscillator array, an interaction computing array, a first feedback module, and a second feedback module. The method includes the parametric oscillator array receives a first group of signals and generates a first group of optical signals based on the first group of signals, where the first group of optical signals include a plurality of first optical signals, the interaction computing array receives the first group of optical signals, and performs matrix operation on the first group of optical signals based on a preset matrix to obtain a second group of optical signals, where the second group of optical signals include a plurality of second optical signals, the first feedback module receives the first group of optical signals, and transmits the first group of optical signals to the parametric oscillator array, and the second feedback module receives the second group of optical signals, and transmits the second group of optical signals to the parametric oscillator array.

In a possible design, the parametric oscillator array receives the first group of optical signals and the second group of optical signals, and outputs a third group of optical signals based on the first group of signals, the first group of optical signals, and the second group of optical signals, the interaction computing array receives the third group of optical signals, and performs matrix operation on the third group of optical signals based on the preset matrix to obtain a fourth group of optical signals, the first feedback module receives the third group of optical signals, and transmits the third group of optical signals to the parametric oscillator array, and the second feedback module receives the fourth group of optical signals, and transmits the fourth group of optical signals to the parametric oscillator array.

In a possible design, the parametric oscillator array includes a plurality of parametric oscillators. Each parametric oscillator receives one first optical signal in the first group of optical signals, and splits the first optical signal into a first part of optical signal and a second part of optical signal based on a preset split ratio, and the parametric oscillator transmits the first part of optical signal to the first feedback module, and transmits the second part of optical signal to the interaction computing matrix.

In a possible design, the parametric oscillator array includes the plurality of parametric oscillators. Each parametric oscillator combines one first optical signal in the first group of optical signals with one second optical signal in the second group of optical signals into one optical signal, and transmits the optical signal obtained through beam combination to the parametric oscillator.

According to a third aspect, this disclosure provides an optical computing chip. The optical computing chip may include the optical computing device according to any one of the first aspect or the possible implementations of the first aspect.

DESCRIPTION OF EMBODIMENTS

To make objectives, technical solutions, and advantages of embodiments of this disclosure clearer, the following further describes embodiments of this disclosure in detail with reference to the accompanying drawings.

In embodiments of this disclosure, "a plurality of" means two or more. In view of this, in embodiments of this disclosure, "a plurality of" may also be understood as "at least two", and "at least one" may be understood as one or more, for example, one, two, or more. "at least one" may be understood as one or more, for example, one, two, or more. For example, including at least one means including one, two, or more without limiting included content. For example, including at least one of A, B, and C may mean including A, B, C, A and B, A and C, B and C, or A, B, and C. The term "and/or" describes an association relationship between associated objects and represents that three relationships may exist. For example, A and/or B may represent the following three cases: only A exists, both A and B exist, and only B exists. In addition, the character "/" generally indicates an "or" relationship between the associated objects unless specified otherwise.

In addition, unless otherwise stated, in embodiments of this disclosure, ordinal numbers such as "first" and "second" are intended to distinguish between a plurality of objects, and are not intended to limit an order, a time sequence, priorities, or importance of the plurality of objects.

This disclosure provides an optical computing device and an optical signal processing method, so as to provide an optical Ising machine with high computing precision and high operation efficiency.

Figure 1:
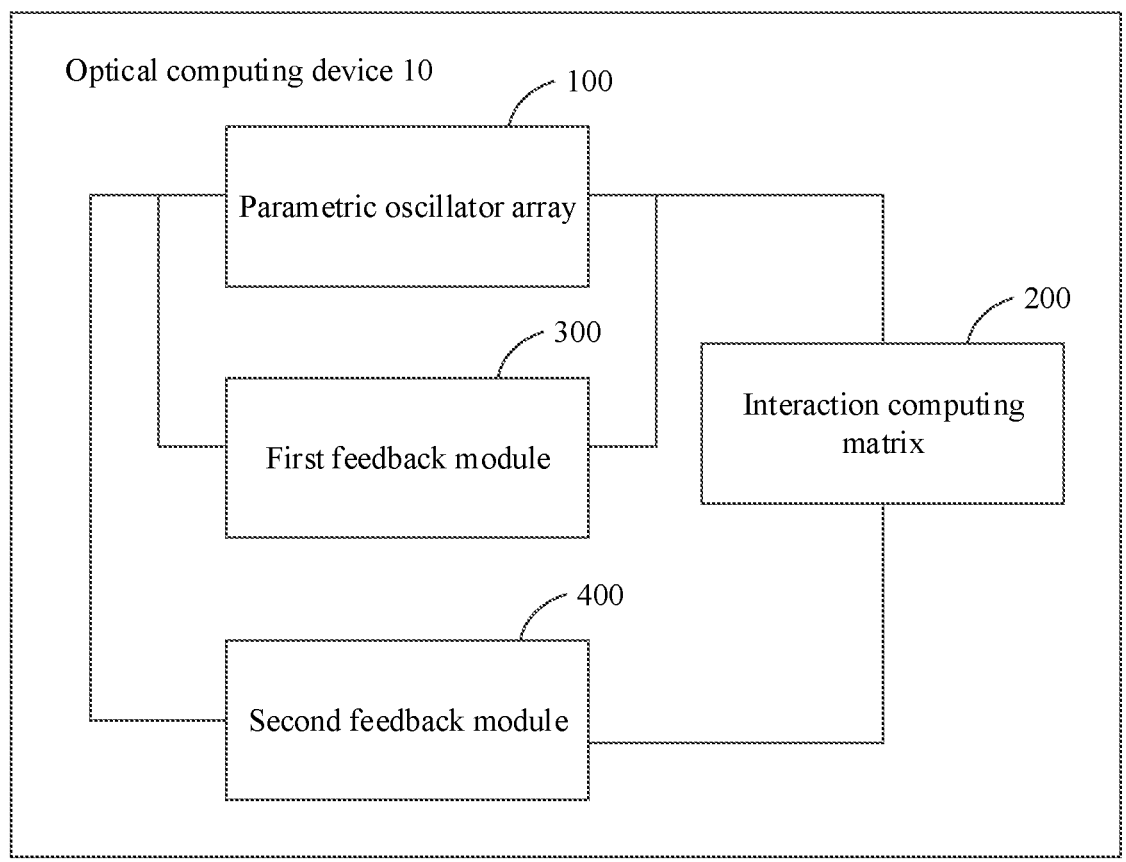
FIG. 1 is a schematic diagram of a structure of an example of an optical computing device according to an embodiment of this disclosure.

FIG. 1 is a diagram of a structure of an example of an optical computing device 10 according to an embodiment of this disclosure. As shown in FIG. 1, the optical computing device 10 includes a parametric oscillator array 100, an interaction computing array 200, a first feedback module 300, and a second feedback module 400. The parametric oscillator array 100 includes a first input end and a first output end. The interaction computing matrix 200 includes a second input end and a second output end. The first output end of the parametric oscillator array 100 is connected to the second input end of the interaction computing array 200. The second output end of the interaction computing array 200 is connected to the first input end of the parametric oscillator array 100 through the second feedback module 400. The first feedback module 300 is connected to two ends of the parametric oscillator array 100.

The parametric oscillator array 100 can receive a first group of signals, and generate a first group of optical signals based on the first group of signals. The first group of optical signals include at least one first optical signal.

In an embodiment of this disclosure, the first group of signals may include an optical signal, such as an optical pulse. Alternatively, the first group of signals may be an electrical signal, such as an electrical pulse. The first group of signals may include one optical signal or one electrical signal, or may include a plurality of optical signals or a plurality of electrical signals. A signal type and a quantity of the first group of signals are not limited herein. It should be noted that, when the first group of signals received by the parametric oscillator array 100 are an electrical signal, the parametric oscillator array 100 may convert the received electrical signal into an optical signal, and then generate the first group of optical signals based on the optical signal obtained through conversion.

In an example, the first group of signals may be sent by a pump source. For example, the pump source may periodically generate a group of signals. A plurality of optical signals or electrical signals included in the group of signals may be the same or different. The plurality of optical signals or electrical signals in the group of signals simultaneously reach the parametric oscillator array 100. The first group of signals may be any group of signals periodically generated by the pump source. Certainly, the first group of signals may alternatively be generated in another manner, and a source of the first group of signals is not limited herein.

The interaction computing matrix 200 may preload a preset matrix used for computing, and after receiving the first group of optical signals generated by the parametric oscillator array 100, perform matrix operation on the first group of optical signals based on the preset matrix. The preset matrix may be used to adjust a parameter such as a phase or an amplitude of the first group of optical signals, so as to obtain a second group of optical signals.

It should be noted that, a quantity of optical signals included in the first group of optical signals may be the same as a quantity of optical signals included in the second group of optical signals. For example, the first group of optical signals include N optical signals, and the second group of optical signals also include N optical signals. In this case, the optical signals in the first group of optical signals are in one-to-one correspondences with the optical signals in the second group of optical signals. Alternatively, the quantity of optical signals included in the first group of optical signals may be different from the quantity of optical signals included in the second group of optical signals. For example, the first group of optical signals include N optical signals, and the second group of optical signals include M optical signals. Both M and N are positive integers, and M is unequal to N.

The first feedback module 300 is configured to, after receiving the first group of optical signals generated by the parametric oscillator array 100, transmit the first group of optical signals to the first input end of the parametric oscillator array 100. The second feedback module 400 is configured to, after receiving the second group of optical signals generated by the interaction computing matrix 200, transmit the second group of optical signals to the first input end of the parametric oscillator array 100.

It can be understood that, the parametric oscillator array 100 is further configured to receive the first group of optical signals and the second group of optical signals. In this way, in a subsequent processing process, the parametric oscillator array 100 outputs a third group of optical signals based on the first group of signals, the first group of optical signals fed back by the first feedback module 300, and the second group of optical signals fed back by the second feedback module 400. The interaction computing array 200 is further configured to receive the third group of optical signals, and perform matrix operation on the third group of optical signals based on the preset matrix to obtain a fourth group of optical signals. The first feedback module 300 is further configured to receive the third group of optical signals, and transmit the third group of optical signals to the first input end of the parametric oscillator array 100. The second feedback module 400 is further configured to receive the fourth group of optical signals, and transmit the fourth group of optical signals to the parametric oscillator array 100. After the foregoing processing process is repeated for a plurality of times, an optimal solution of the optical computing device 10 is obtained.

The foregoing content summarizes functions of the modules of the optical computing device 10, and the following describes the modules in detail.

1. Parametric Oscillator Array 100:

The parametric oscillator array 100 includes a plurality of parallel parametric oscillators 110. A quantity of the plurality of parametric oscillators 110 may be the same as a quantity of optical signals or electrical signals included in the first group of signals received by the parametric oscillator array 100. Alternatively, because the parametric oscillator array 100 is further configured to receive the first group of optical signals and the second group of optical signals, the quantity of the plurality of parametric oscillators 110 may be the same as the quantity of optical signals included in the first group of optical signals or the second group of optical signals. If the quantity of optical signals or electrical signals included in the first group of signals, the quantity of optical signals included in the first group of optical signals, and the quantity of optical signals included in the second group of optical signals are different from one another, the quantity of the plurality of parametric oscillators 110 may be a maximum value among the quantities of optical signals or electrical signals included in the three groups of signals. For ease of description, the following uses an example in which the quantities of optical signals or electrical signals included in the three groups of signals are the same.

Each of the plurality of parallel parametric oscillators 110 is configured to receive one signal in the first group of signals, and/or configured to receive one optical signal in the first group of optical signals fed back by the first feedback module 300, and/or configured to receive one optical signal in the second group of optical signals fed back by the second feedback module 400.

Figure 2:
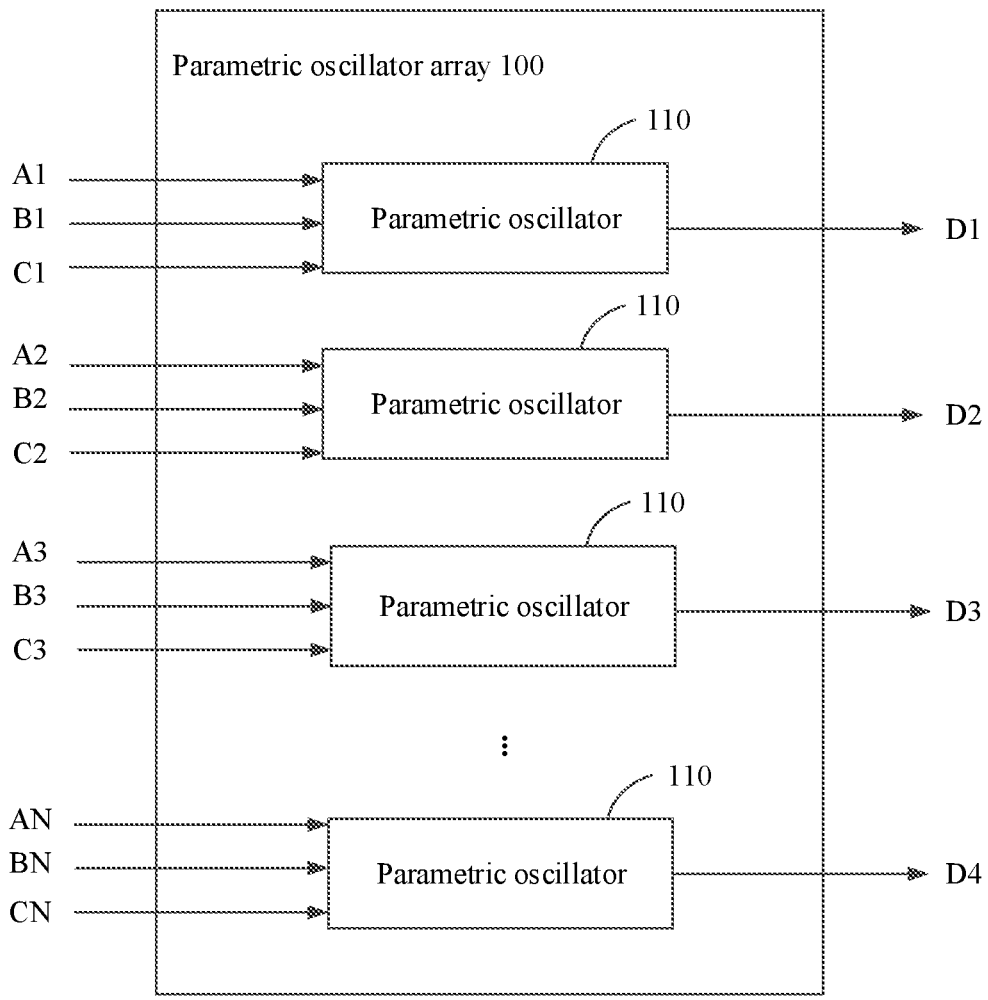
FIG. 2 is a schematic diagram of a structure of an example of a parametric oscillator array according to an embodiment of this disclosure.

Referring to FIG. 2, for example, the parametric oscillator array 100 includes N parallel parametric oscillators 110, the first group of signals is optical signal group A including optical signals A1, A2, A3, ..., and AN, the first group of optical signals is optical signal group B including optical signals B1, B2, B3, ..., and BN, and the second group of optical signals is optical signal group C including optical signals C1, C2, C3, ..., and CN. In this case, the first parametric oscillator 110 is configured to receive the optical signals A1, B1, and C1, and generate one optical signal (denoted as optical signal D1) in the third group of optical signals based on the optical signals A1, B1, and C1, the second parametric oscillator 110 is configured to receive the optical signals A2, B2, and C2, and generate another optical signal (denoted as optical signal D2) in the third group of optical signals based on the optical signals A2, B2, and C2, and so on. Because each parametric oscillator 110 can independently process the optical signals received by the parametric oscillator 110, the parametric oscillator 110 can process a plurality of optical signals in one received group of optical signals in parallel, thereby improving operation efficiency of the optical computing device 10.

In this embodiment of this disclosure, the parametric oscillator 110 may be an optical parametric oscillator, for example, may be an optical parametric oscillator of an optical pump or an optical parametric oscillator 110 of an electric pump, or may be a laser oscillator, a Kerr oscillator, or a polaron. Alternatively, the parametric oscillator 110 may be any parametric oscillator capable of performing oscillation based on a frequency of an optical signal. This is not limited herein.

Figure 3:
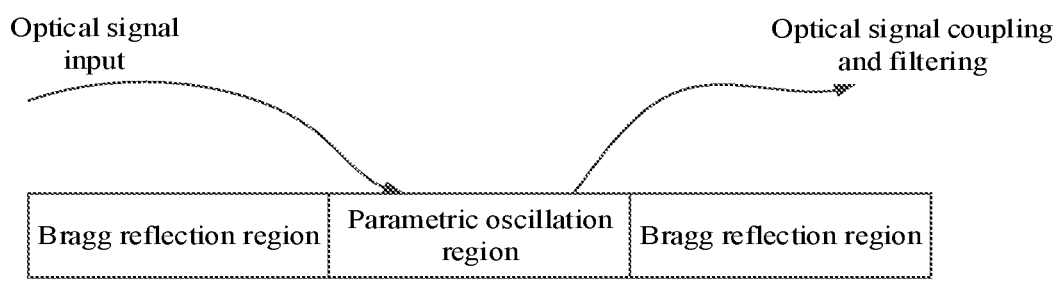
FIG. 3 is a schematic diagram of a structure of an example of an optical parametric oscillator according to an embodiment of this disclosure.

In an example, when the parametric oscillator 110 is an optical parametric oscillator, the optical parametric oscillator may generate a new optical signal through nonlinear optical interaction. FIG. 3 is a schematic diagram of a structure of an example of an optical parametric oscillator according to an embodiment of this disclosure. As shown in FIG. 3, the optical parametric oscillator includes two Bragg reflection regions and one optical parametric oscillation region. The Bragg reflection regions are located at two ends of the optical parametric oscillation region. The two Bragg reflection regions form a resonant cavity, and an optical signal received by the optical parametric oscillator is transmitted back and forth between the two Bragg reflection regions for oscillation. The optical signal is coupled and input to the optical parametric oscillation region to produce a nonlinear action with an optical signal transmitted by each of the first feedback module 300 and the second feedback module 400. An optical signal obtained after the nonlinear action is coupled and filtered from the optical parametric oscillation region. Optical signals left in the optical parametric oscillator are a group of optical signals output by the parametric oscillator array 100, for example, the first group of optical signals or the third group of optical signals described above.

The following describes the optical parametric oscillation region in the optical parametric oscillator 110.

Figure 4:
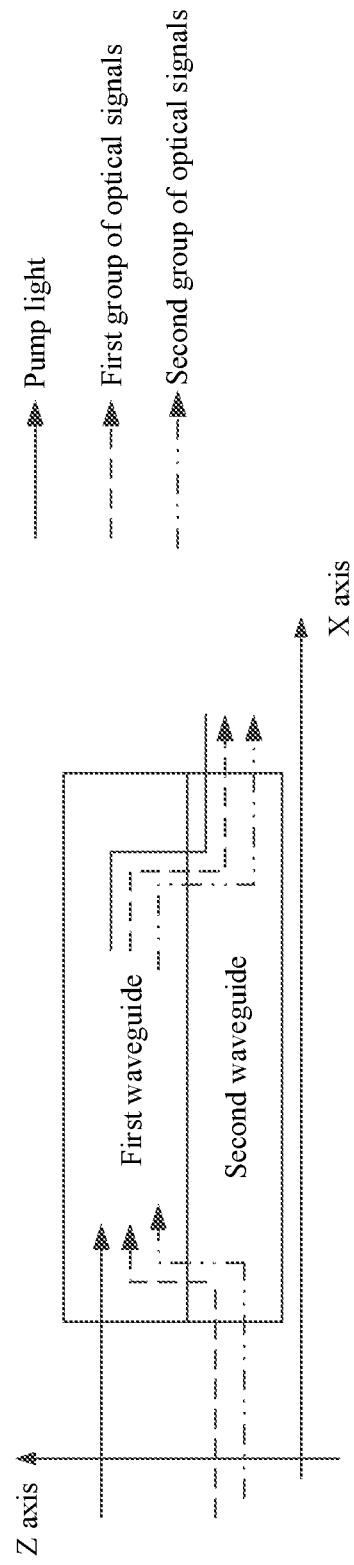
FIG. 4 is a schematic diagram of a structure of an example of an optical parametric oscillation region according to an embodiment of this disclosure.

FIG. 4 is a schematic diagram of a structure of an example of an optical parametric oscillation region according to an embodiment of this disclosure. FIG. 4 is a sectional view of the optical parametric oscillation region on an XZ plane of a world coordinate system. As shown in FIG. 4, the optical parametric oscillation region includes two waveguides: a first waveguide and a second waveguide. The first waveguide is integrated on the second waveguide, and the first waveguide is a waveguide having a nonlinear effect. The following describes working principles of the first waveguide and the second waveguide with respect to different signals received by the optical parametric oscillator.

In a first case, the optical parametric oscillator generates the first group of optical signals based on the received first group of signals.

For example, the first group of signals are pump light. The pump light may enter the first waveguide in an end-face coupling manner. After a nonlinear action of the first waveguide, the first group of optical signals are obtained, and then are vertically coupled into the second waveguide.

In a second case, the optical parametric oscillator generates the third group of optical signals based on the first group of signals, the first group of optical signals, and the second group of optical signals that are received.

Still using the example in which the first group of signals are pump light, the pump light enters the first waveguide in the end-face coupling manner. The first group of optical signals and the second group of optical signals may be vertically coupled into the first waveguide in a mode-field conversion manner. Then, the pump light, the first group of optical signals, and the second group of optical signals jointly undergo a nonlinear action of the first waveguide to obtain the third group of optical signals, which are then vertically coupled into the second waveguide.

It should be noted that, in the second case, the pump light, the first group of optical signals, and the second group of optical signals need to jointly undergo the nonlinear action of the first waveguide. Therefore, when coupled into the first waveguide, the pump light, the first group of optical signals, and the second group of optical signals need to overlap in time domain, and it is necessary to control a time in which the pump light, the first group of optical signals, and the second group of optical signals are optically coupled into the first waveguide. In an example, lengths of optical signal transmission paths in the first feedback module 300 and the second feedback module 400 and an optical signal generation period of the pump source may be adjusted, so that the pump light, the first group of optical signals, and the second group of optical signals can simultaneously enter the first waveguide within a specified time period.

In this embodiment of this disclosure, the first waveguide and the second waveguide may be waveguides of different materials. For example, the first waveguide is a waveguide having a nonlinear effect, for example, may be a lithium niobate waveguide or a lithium tantalate waveguide that has second-order nonlinearity, or may be a waveguide material having third-order nonlinearity. The second waveguide may be a waveguide having a feature of a low transmission loss, and a waveguide having the feature of a low transmission loss may be understood as a waveguide whose transmission loss is less than a threshold, for example, may be a silicon nitride waveguide, or may be another semiconductor material having a wide transparent-transmission spectrum and a low transmission loss, such as silicon or silicon dioxide. An integration manner of the first waveguide and the second waveguide may be integrating the first waveguide on a material of the second waveguide by using a heterogeneous integration technology, or integrating the second waveguide on a material of the first waveguide. Specific materials of the first waveguide and the second waveguide and an integration manner thereof are not limited herein.

In the foregoing optical parametric oscillation region, optical signals in a compressed state may be generated by using the nonlinear effect of the first waveguide. The optical signals in the compressed state may be understood as input optical signals in all possible states required for computing, and the generated optical signals in the compressed state are transmitted by using the second waveguide having the feature of a low transmission loss. This can prevent the optical computing device 10 from obtaining a non-locally-optimal solution. Feature advantages of different waveguide materials are combined in a heterogeneous integration manner, and computing precision of the optical computing device 10 can be ensured.

In addition, it can be learned from the foregoing description that, an optical signal output by the optical parametric oscillator further includes pump light, and the pump light affects a computing result of the interaction computing matrix 200. Therefore, to ensure accuracy of a computing result of the optical computing device 10, a filter may be further disposed after each parametric oscillator. The filter may be a narrow-band microring filter or the like, and the filter filters out the pump light in the optical signal output by the parametric oscillator.

2. Interaction Computing Matrix 200:

After the parametric oscillator array 100 outputs the first group of optical signals or the third group of optical signals, the interaction computing matrix 200 performs matrix operation on the first group of optical signals or the third group of optical signals to obtain a corresponding operation result, that is, the second group of optical signals corresponding to the first group of optical signals or the fourth group of optical signals corresponding to the third group of optical signals. A process of processing the first group of optical signals by the interaction computing matrix 200 is the same as a process of processing the third group of optical signals by the interaction computing matrix 200. The process of processing the first group of optical signals by the interaction computing matrix 200 is used as an example for description below.

In an example, the first group of optical signals may be a group of optical signals including N optical signals, and is denoted as f(t). An expression thereof is as follows:

$$f(t)=[f_1, f_2, \ldots, f_n] \tag{1}$$

$f_1, f_2, \ldots, f_n$ are respectively column vectors corresponding to the N optical signals. The interaction computing matrix 200 forms an n*n symmetric matrix related to an NP-hard problem to be resolved. For example, the n*n symmetric matrix may be obtained by performing mathematical abstraction on the NP-hard problem. The n*n symmetric matrix is denoted as J, and its expression is as follows:

$$J = \begin{bmatrix} J_{11} & \cdots & J_{1n} \\ \vdots & \ddots & \vdots \\ J_{n1} & \cdots & J_{nn} \end{bmatrix} \tag{2}$$

After the interaction computing matrix 200 performs operation on the first group of optical signals, output signals corresponding to the first group of optical signals are obtained, and are denoted as y(t). y(t) meets the following expression:

$$y(t)=J*f=f_1 J_{11}+f_2 J_{12}+ \ldots +f_n J_{1n} \tag{3}$$

Figure 5:
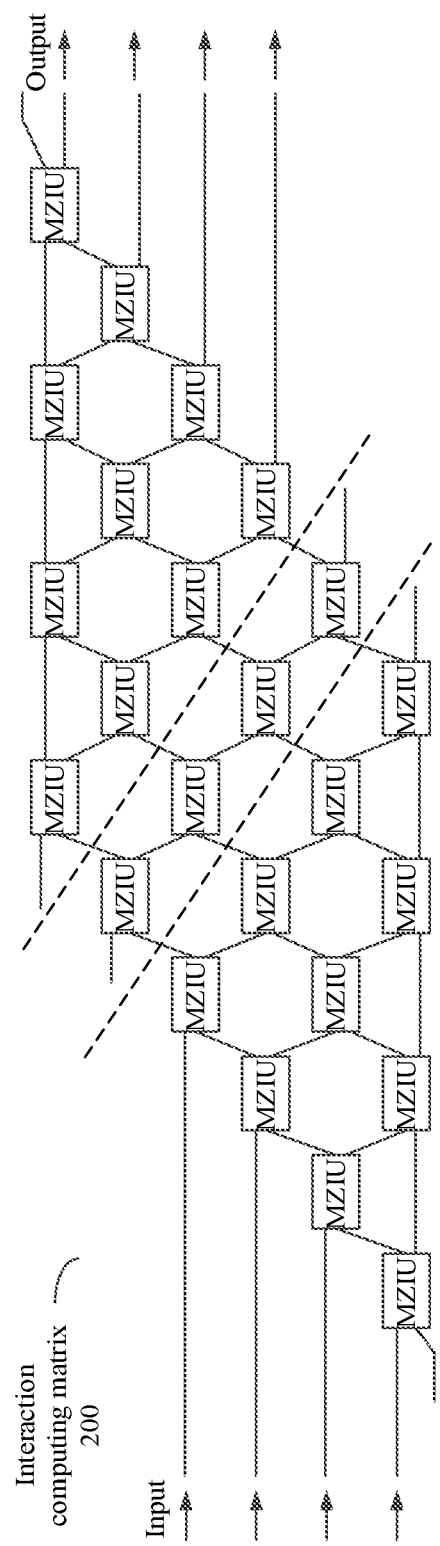
FIG. 5 is a schematic diagram of a structure of an example of an interaction computing matrix according to an embodiment of this disclosure.

FIG. 5 is a schematic diagram of a structure of an example of an interaction computing matrix 200 according to an embodiment of this disclosure. The interaction computing matrix 200 includes a plurality of cascaded Mach-Zehnder interferometer units (MZIU). In this embodiment of this disclosure, each MZIU may receive two optical signals. Each MZIU is configured to implement interaction between the two input optical signals. The interaction may be interaction between phases of the two input optical signals, or may be interaction between signal amplitudes of the two input optical signals, or may be interaction on other parameters of the optical signals. This is not limited herein. For ease of description, the following uses an example in which the interaction is the interaction on the phases of the two input optical signals.

Each MZIU may control the phases of the two input optical signals by using a phase parameter of an MZI. Each element in the foregoing n*n symmetric matrix corresponds to a phase parameter of each of the plurality of cascaded MZIUs. Then, the phase parameter of each MZIU is set based on the two-dimensional matrix.

In the interaction computing matrix 200 shown in FIG. 5, an optical signal is input from a left end of the interaction computing matrix 200, and a computing result computed by the interaction computing matrix 200 is output from a right end. As shown in FIG. 5, the plurality of cascaded MZIUs may be divided into three parts based on locations shown by dashed lines in the figure. The first part of MZIU matrix includes a plurality of MZIUs forming a triangle. The second part of MZIU matrix includes a plurality of MZIUs cascaded diagonally. The third part of MZIU matrix includes a plurality of MZIUs forming an inverted triangle. When the phase parameter of each MZIU is set based on the foregoing n*n symmetric matrix, the n*n symmetric matrix may be divided into three sub-matrices, and then the three sub-matrices are respectively mapped to the three parts of MZIU matrix. Certainly, the n*n symmetric matrix may alternatively be mapped to the plurality of cascaded MZIUs in another manner, which is not limited herein.

Figure 6:
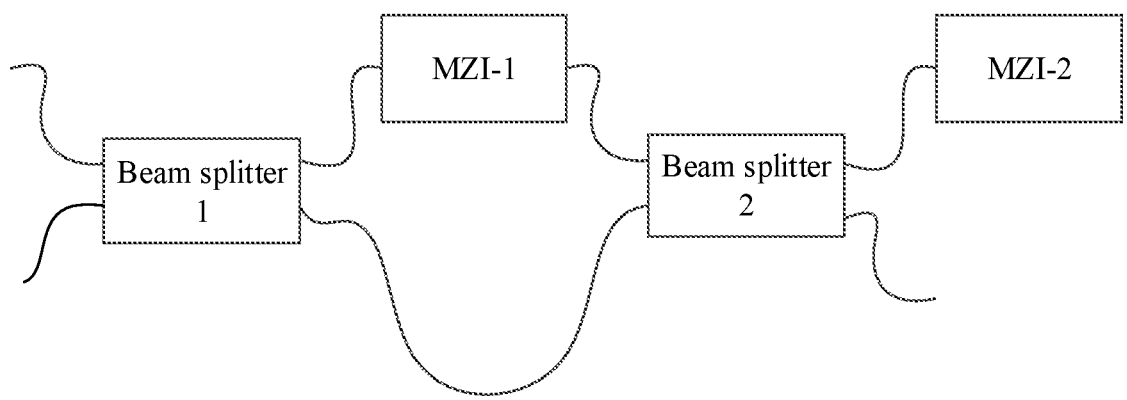
FIG. 6 is a schematic diagram of a structure of an example of an MZIU according to an embodiment of this disclosure.

FIG. 6 is a schematic diagram of a structure of an example of an MZIU according to an embodiment of this disclosure. Each MZIU includes a plurality of Mach-Zehnder interferometers (MZIs) and a plurality of beam splitters. In FIG. 6, for example, the MZIU includes two MZIs (which are respectively MZI-1 and MZI-2) and two beam splitters (which are respectively beam splitter 1 and beam splitter 2). Lower ports of the two beam splitters are directly connected, and an upper port of each beam splitter is separately connected to one beam splitter. For example, an upper port of beam splitter 1 is connected to MI-1, and an upper port of beam splitter 2 is connected to MZI-2. A split ratio of a beam splitter may be set based on an actual use requirement. In an example, a split ratio of the beam splitter may be 50/50. In this way, an optical signal transmitted to the MZIU is evenly split and transmitted to MZI-1 and the lower beam splitter 2. In addition, a phase parameter of each MI may be adjusted by using a phase controller of the MI. Phase parameters of the plurality of MZIs included in one MZIU may be the same or different. A specific value is determined based on the foregoing n*n symmetric matrix.

Figure 7:
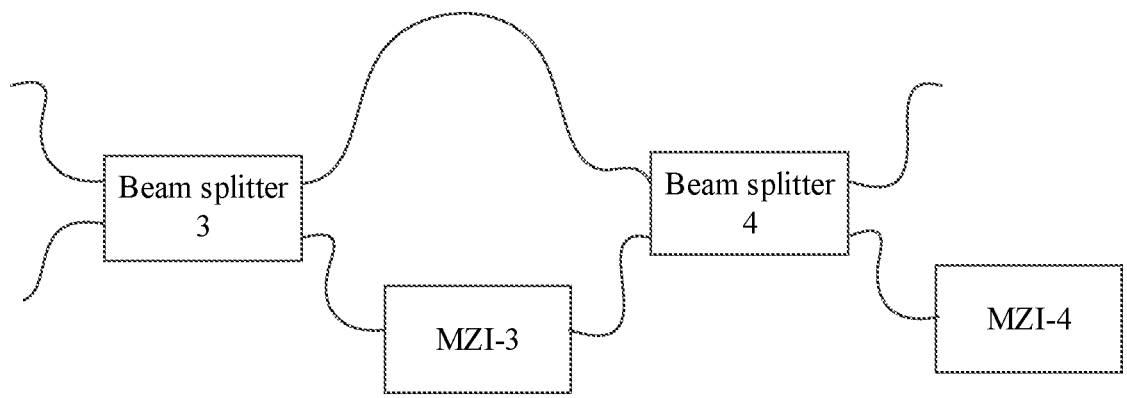
FIG. 7 is a schematic diagram of a structure of another example of an MZIU according to an embodiment of this disclosure.

FIG. 7 is a schematic diagram of a structure of another example of an MZIU according to an embodiment of this disclosure. Each MZIU includes two MZIs (which are respectively MI-3 and MZI-4) and two beam splitters (which are respectively beam splitter 3 and beam splitter 4). However, a connection manner of the MZIs and the beam splitters in the MZIU shown in FIG. 7 is opposite to that in FIG. 6. Upper ports of the two beam splitters are directly connected, and a lower port of each beam splitter is separately connected to one beam splitter. For example, a lower port of beam splitter 3 is connected to MZI-3, and a lower port of beam splitter 4 is connected to MZI-4. Settings of the MZIs and the beam splitters are similar to those in FIG. 6, and details are not described herein again.

In an example, in the plurality of cascaded MZIUs shown in FIG. 5, a structure of the MZIUs in the first part of MZIU matrix is the same as that of the MZIUs in the second part of MZIU matrix, and is different from that of the MZIUs in the third part of MZIU matrix. For example, the MZIUs in the first part of MZIU matrix and the second part of MZIU matrix use the MZIU structure shown in FIG. 6, and the MZIUs in the third part of MZIU matrix use the MZIU structure shown in FIG. 7. Alternatively, the MZIUs in the first part of MZIU matrix and the second part of MZIU matrix use the MZIU structure shown in FIG. 7, and the MZIUs in the third part of MZIU matrix use the MZIU structure shown in FIG. 6. This is not limited herein.

In addition, in this embodiment of this disclosure, the two MZIs included in the MZIU described in FIG. 6 may be formed by using a material having a feature of a dynamically tunable phase. The material may be a material having an electro-optic effect, such as a lithium niobate material, an organic polymer material, or the like. Alternatively, the material may be a material having a magneto-optic effect. No enumeration is provided herein. The two MZIs in one MZIU are formed by using different materials having the feature of a dynamically tunable phase. For example, one MZI is formed by using the lithium niobate material and the other MZI is formed by using the organic polymeric material. Alternatively, one MZI is formed by using a material having the magneto-optic effect and the other MZI is formed by using a material having the electro-optic effect.

Because the electro-optic effect and the magneto-optic effect each can rapidly change a dielectric constant, an MZI formed by using a material having a feature of the electro-optic effect or the magneto-optic effect can quickly load and refresh its own phase parameter. This can implement quick loading and refreshing of the interaction computing matrix, thereby further improving the operation efficiency of the optical computing device 10.

Further, because a size of the MZI is relatively small, the optical computing device 10 has a more compact structure, and can be implemented on a chip, thereby ensuring stability of the optical computing device 10.

3. The First Feedback Module 300 and the Second Feedback Module 400:

The first feedback module 300 and the second feedback module 400 each may include a plurality of fiber waveguides, and each fiber waveguide may transmit one optical signal.

The first feedback module 300 is connected to the two ends of the parametric oscillator array 100. After the parametric oscillator array 100 outputs the first group of optical signals, the first feedback module 300 feeds each optical signal in the first group of optical signals back to the parametric oscillator array 100. When the parametric oscillator array 100 is shown in FIG. 2, a quantity of fiber waveguides included in the first feedback module 300 is the same as a quantity of parametric oscillators 110 included in the parametric oscillator array 100. In addition, each fiber waveguide is connected to two ends of one parametric oscillator 110, and is configured to feed an optical signal output by the parametric oscillator 110 back to the parametric oscillator 110.

The second feedback module 400 is connected to the parametric oscillator array 100 and the interaction computing matrix 200. After the interaction computing matrix 200 outputs the second group of optical signals, the second feedback module 400 feeds each optical signal in the second group of optical signals back to the parametric oscillator array 100. When the parametric oscillator array 100 is shown in FIG. 2, and the quantity of optical signals included in the second group of optical signals output by the interaction computing matrix 200 is the same as the quantity of parametric oscillators 110 included in the parametric oscillator array 100, a quantity of fiber waveguides included in the second feedback module 400 is the same as the quantity of parametric oscillators 110 included in the parametric oscillator array 100.

Alternatively, the second feedback module 400 may further include a fiber combiner or a fiber splitter. For example, if the parametric oscillator array 100 includes N parametric oscillators 110 to output the first group of optical signals including N optical signals, the second group of optical signals include 2N optical signals after matrix operation performed by the interaction computing matrix 200. In this case, one fiber combiner may be disposed between any two fiber waveguides, and optical signals transmitted on the two fiber waveguides may be combined into one signal in time domain by using the fiber combiner, so as to obtain N optical signals obtained after combination. Then, the N optical signals obtained after combination are fed back to the N parametric oscillators 110.

Alternatively, the first feedback module 300 and the second feedback module 400 each may include only one fiber and only one fiber combiner. The first group of optical signals output by the parametric oscillator array 100 may be combined into one signal in time domain by using the fiber combiner. Then, the signal obtained through beam combination may be fed back to the parametric oscillator array 100 by using the fiber included in the first feedback module 300. In this case, after receiving the signal that is obtained through beam combination and that is fed back by the first feedback module 300, the parametric oscillator array 100 may split the signal obtained through beam combination into N signals, and then perform processing based on the N signals.

In this embodiment of this disclosure, the fiber waveguides included in the first feedback module 300 and the second feedback module 400 each may be a waveguide having the feature of a low transmission loss, for example, may be a silicon nitride waveguide, or may be another semiconductor material having a low transmission loss, such as silicon or silicon dioxide. In this way, losses of the optical signals fed back by the first feedback module 300 and the second feedback module 400 to the parametric oscillator array 100 can be reduced, distortion of the optical signals in a transmission process can be reduced, and accuracy of an operation result of the optical computing device 10 can be improved.

The foregoing embodiment provides a description of the optical computing device 10 by using an example in which the optical computing device 10 includes the parametric oscillator array 100, the interaction computing matrix 200, the first feedback module 300, and the second feedback module 400. However, in another embodiment, the optical computing device 10 may further include another module. For example, it can be learned from the foregoing content that, the first group of optical signals (or the third group of optical signals) output by the parametric oscillator array 100 are fed back to the parametric oscillator array 100 by the first feedback module 300. The first group of optical signals (or the third group of optical signals) further participate in the matrix operation in the interaction computing matrix 200. Therefore, an optical splitter may be further disposed among the parametric oscillator array 100, the first feedback module 300, and the interaction computing matrix 200.

Figure 8:
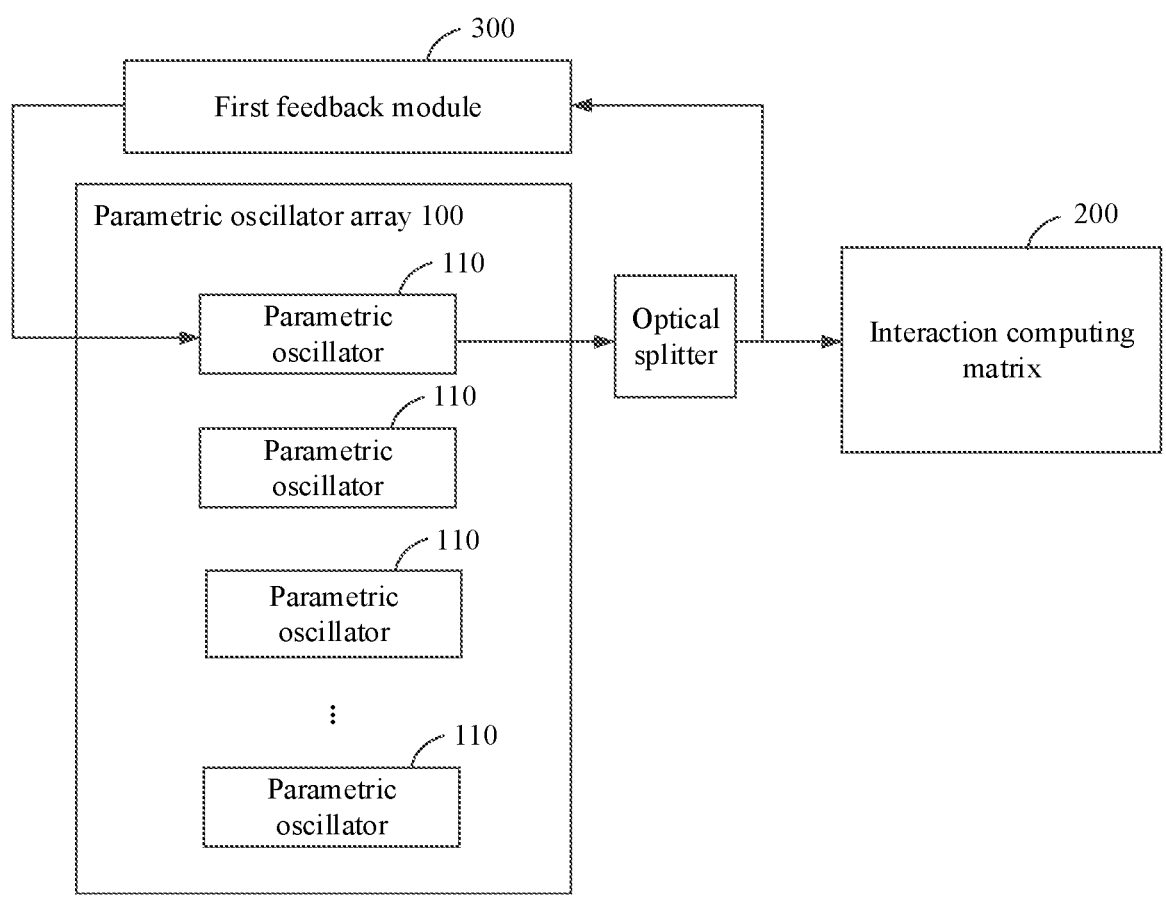
FIG. 8 is a schematic diagram of a structure of an example in which an optical splitter is disposed between a parametric oscillator and an interaction computing matrix according to an embodiment of this disclosure.

Referring to FIG. 8, one of the plurality of parametric oscillators 110 included in the parametric oscillator array 100 is used as an example, and an optical splitter is disposed between the parametric oscillator 110 and the interaction computing matrix 200. In this way, one part of an optical signal output by the parametric oscillator 110 is transmitted to the first feedback module 300, and the other part of the optical signal is transmitted to the interaction computing matrix 200. An optical splitter may also be disposed in a same manner for another parametric oscillator 110, and details are not described herein again. In an example, the optical splitter may be a tunable MZI splitter. The tunable MZI splitter controls a phase parameter of an MZI in a thermal tuning manner, so that a split ratio of the MZI splitter can be dynamically adjusted. For example, the split ratio may be 90/10. After an optical signal output by each parametric oscillator 110 passes through the MZI splitter, 90% of the optical signal is transmitted to the first feedback module 300, and 10% of the optical signal is transmitted to the interaction computing matrix 200.

In addition, because the parametric oscillator array 100 needs to generate, based on the optical signals fed back by the first feedback module 300 and the second feedback module 400, input signals (for example, the third group of optical signals) required for computing by the optical computing device 10, a beam combiner may further be disposed at the input end of the parametric oscillator array 100.

Figure 9:
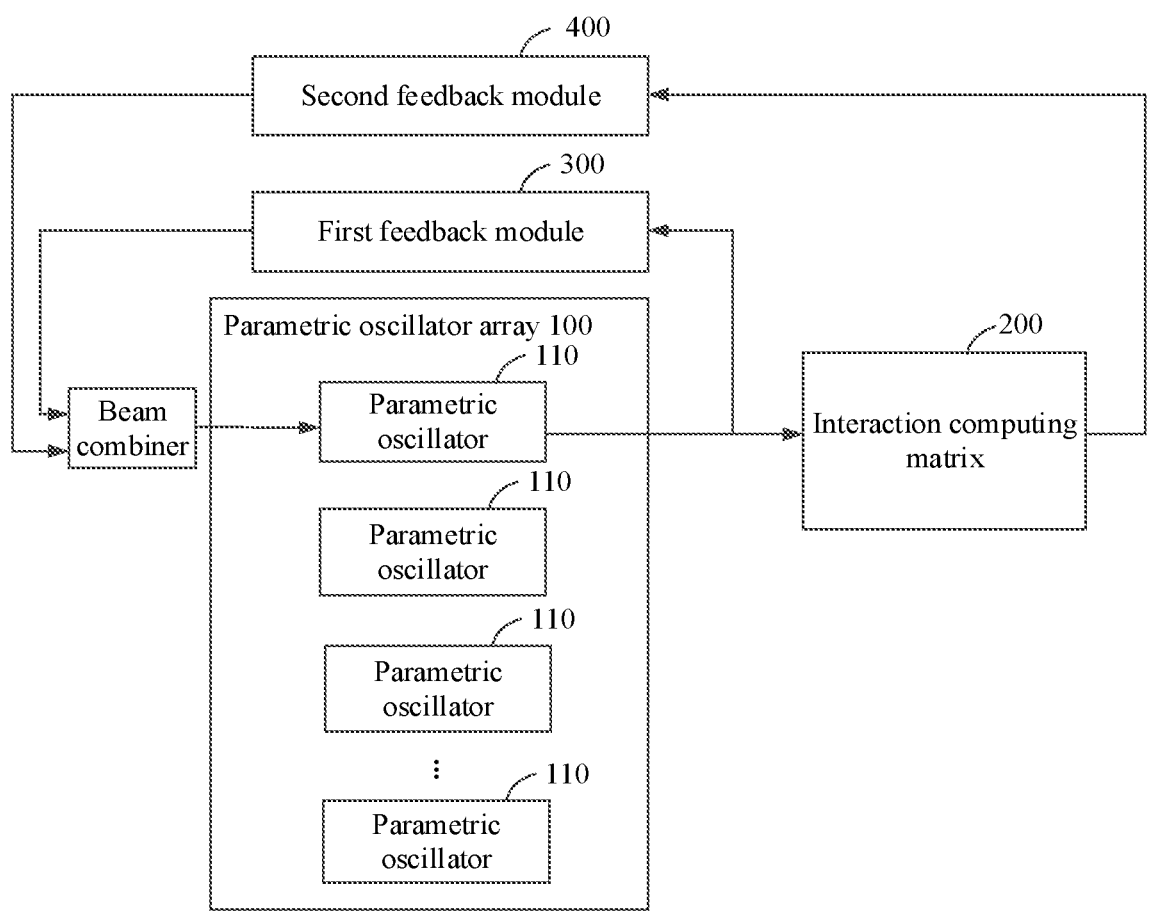
FIG. 9 is a schematic diagram of a structure of an example in which a beam combiner is disposed between a parametric oscillator and a second feedback module according to an embodiment of this disclosure.

Referring to FIG. 9, one of the plurality of parametric oscillators 110 included in the parametric oscillator array 100 is used as an example, and a beam combiner is disposed between the parametric oscillator 110 and the second feedback module 400. In this way, one optical signal fed back by the first feedback module 300 and one optical signal fed back by the second feedback module 400 are combined into one optical signal in time domain, which is then input to the parametric oscillator 110 for processing. A beam combiner may also be disposed in a same manner for another parametric oscillator 110, and details are not described herein again.

Alternatively, the optical computing device 10 may further include a phase detector. The phase detector may be a balanced homodyne detector (BHD) or the like. The phase detector may be connected to the parametric oscillator array 100 to detect a phase of each optical signal in a group of optical signals output by the parametric oscillator array 100, so as to determine a computing result of the optical computing device 10 based on the phase of each optical signal. For example, when the detector detects that the phase of each optical signal output by the parametric oscillator array 100 is 0 or $\pi$, a final computing result is determined based on the group of optical signals.

Certainly, the optical computing device 10 may further include other modules, which are not enumerated herein.

In the optical computing device provided in this embodiment of this disclosure, the parametric oscillator array and the interaction computing matrix perform parallel processing processes on a plurality of optical signals included in one group of optical signals. Therefore, even if a quantity of nodes in an Ising model is relatively large, and a relatively large quantity of input optical signals need to be introduced, an operation time of the optical computing device does not increase.

In addition, the parametric oscillator array generates the optical signals used for computing by the optical computing device, so as to obtain the optical signals in the compressed state. This can ensure to a maximum extent that an optimal solution obtained by using the optical computing device is a global optimal solution, thereby ensuring computing precision.

In addition, because the optical computing device provided in this embodiment of this disclosure has a simple structure, the optical computing device can be implemented on a chip. This provides a feasible solution for subsequent clustering of optical Ising machines. In addition, an entire computing process is implemented in an optical signal manner. A signal transmission speed is high, and a computing speed is greatly increased. Therefore, the optical computing device provided in this embodiment of this disclosure may be applied to a neural network system, for example, may be configured to implement feedback control in the neural network system.

The following describes an optical signal processing method provided in an embodiment of this disclosure with reference to the foregoing embodiments by using the optical computing device shown in FIG. 1 as an example.

Figure 10:
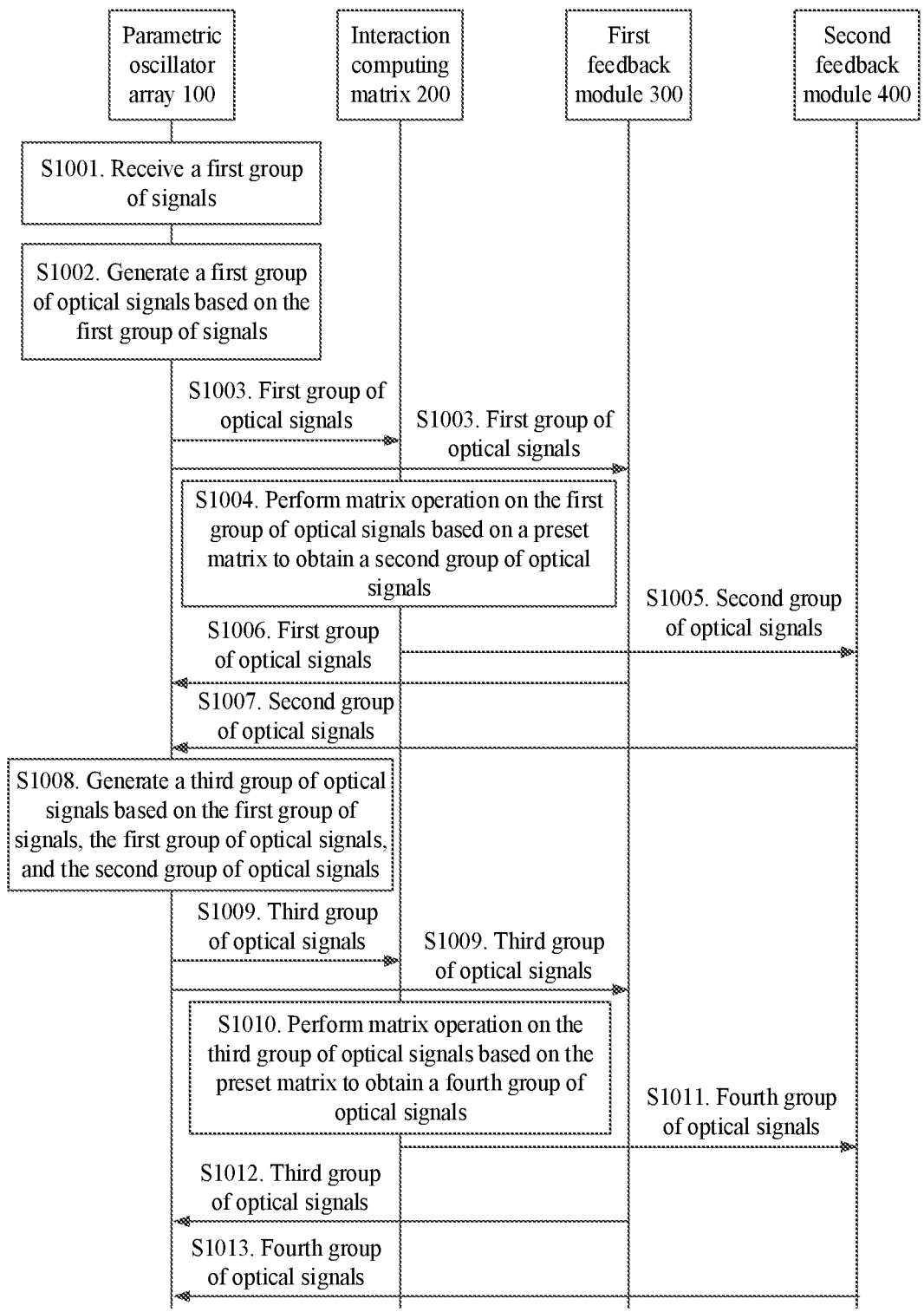
FIG. 10 is a flowchart of an optical signal processing method according to an embodiment of this disclosure.

FIG. 10 is a flowchart of an optical signal processing method according to an embodiment of this disclosure. The flowchart is described as follows.

S1001. The parametric oscillator array 100 receives a first group of signals.

For a description of the first group of signals, refer to the foregoing description of the parametric oscillator array 100. Details are not described herein again.

S1002. The parametric oscillator array 100 generates a first group of optical signals based on the first group of signals.

The first group of optical signals include a plurality of first optical signals. For a process in which the parametric oscillator array 100 generates the first group of optical signals based on the first group of signals, refer to the foregoing description of the parametric oscillator array 100. Details are not described herein again.

S1003. The parametric oscillator array 100 outputs the first group of optical signals, and the interaction computing array 200 and the first feedback module 300 separately receive the first group of optical signals.

The parametric oscillator array 100 may include a plurality of parametric oscillators. A quantity of the plurality of parametric oscillators is the same as a quantity of optical signals included in the first group of optical signals. Each parametric oscillator is configured to output one optical signal in the first group of optical signals.

In an example, each parametric oscillator receives one optical signal in the first group of optical signals, splits the optical signal into a first part of optical signal and a second part of optical signal based on a preset split ratio, and then transmits the first part of optical signal to the first feedback module 300 and the second part of optical signal to the interaction computing matrix 200. For a specific process, refer to the content described for FIG. 8.

S1004. The interaction computing array 200 performs matrix operation on the first group of optical signals based on a preset matrix to obtain a second group of optical signals.

The second group of optical signals include a plurality of second optical signals. For a specific process of step S1004, refer to the foregoing description of the interaction computing matrix 200. Details are not described herein again.

S1005. The interaction computing array 200 outputs the second group of optical signals, and the second feedback module 400 receives the second group of optical signals.

S1006. The first feedback module 300 transmits the first group of optical signals to the parametric oscillator array 100.

S1007. The second feedback module 400 transmits the second group of optical signals to the parametric oscillator array 100.

S1008. The parametric oscillator array 100 generates a third group of optical signals based on the first group of signals, the first group of optical signals, and the second group of optical signals.

Step S1008 is similar to step S1002, and is not described repeatedly herein.

It should be noted that, each parametric oscillator may combine one optical signal in the first group of optical signals and one optical signal in the second group of optical signals into one optical signal, and transmit the optical signal obtained through beam combination to the parametric oscillator for the foregoing processing. For a specific process, refer to the content described for FIG. 9.

S1009. The parametric oscillator array 100 outputs the third group of optical signals, the interaction computing array 200 receives the third group of optical signals, and the first feedback module 300 receives the third group of optical signals.

Step S1009 is similar to step S1003, and is not described repeatedly herein.

S1010. The interaction computing array 200 performs matrix operation on the third group of optical signals based on the preset matrix to obtain a fourth group of optical signals.

S1011. The interaction computing array 200 outputs the fourth group of optical signals, and the second feedback module 400 receives the fourth group of optical signals.

S1012. The first feedback module 300 transmits the third group of optical signals to the parametric oscillator array 100.

S1013. The second feedback module 400 transmits the fourth group of optical signals to the parametric oscillator array 100.

It can be understood that, in actual application, step S1008 to step S1013 may be performed for a plurality of times, and a quantity of times of performing each step is not limited herein. When a phase of each optical signal in a group of optical signals output by the parametric oscillator array 100 meets a preset condition, for example, the phase of each optical signal is 0 or $\pi$, a final computing result is determined based on the group of optical signals.

It should be noted that embodiments provided in this disclosure are merely examples. A person skilled in the art may clearly know that, for convenience and conciseness of description, embodiments emphasize different aspects in the foregoing embodiments. For a part not described in detail in one embodiment, refer to related description of another embodiment. Features disclosed in embodiments, claims, and accompanying drawings of this disclosure may exist independently, or exist in a combination. Features described in a hardware form in embodiments of the present disclosure may be executed by software, and vice versa, which is not limited herein.

What is claimed is:

1. An optical computing device, comprising:
a parametric oscillator array comprising two ends and configured to:
receive a first group of signals; and
generate, based on the first group of signals, a first group of optical signals comprising a plurality of first optical signals;

an interaction computing array coupled to the parametric oscillator array and configured to:
receive the first group of optical signals; and
perform, based on a preset matrix, a first matrix operation on the first group of optical signals to obtain a second group of optical signals that comprises a plurality of second optical signals;
a first feedback system coupled to the two ends and configured to;
receive the first group of optical signals; and
transmit the first group of optical signals to the parametric oscillator array; and
a second feedback system coupled to the parametric oscillator array and the interaction computing array and configured to:
receive the second group of optical signals; and
transmit the second group of optical signals to the parametric oscillator array.

2. The optical computing device of claim 1, wherein the parametric oscillator array is further configured to:
receive the first group of optical signals and the second group of optical signals; and
output, based on the first group of signals, the first group of optical signals, and the second group of optical signals, a third group of optical signals,
wherein the interaction computing array is further configured to:
receive the third group of optical signals; and
perform, based on the preset matrix, a second matrix operation on the third group of optical signals to obtain a fourth group of optical signals,
wherein the first feedback system is further configured to:
receive the third group of optical signals; and
transmit the third group of optical signals to the parametric oscillator array, and
wherein the second feedback system is further configured to:
receive the fourth group of optical signals; and
transmit the fourth group of optical signals to the parametric oscillator array.

3. The optical computing device of claim 1, wherein the parametric oscillator array comprises a plurality of parametric oscillators, and wherein each of the parametric oscillators comprises:
a first waveguide made of a first material having a nonlinear effect; and
a second waveguide made of a second material that is different than the first material.

4. The optical computing device of claim 3, wherein the second material has a transmission loss that is less than a threshold.

5. The optical computing device of claim 1, wherein the interaction computing array comprises a plurality of cascaded Mach-Zehnder interferometer (MZI) systems, and wherein each of the cascaded MZI systems comprises:
a plurality of first MZ interferometers (MZIs), wherein each of the first MZIs comprises a waveguide comprising a dielectric constant adjustment speed that is less than a threshold, and wherein the waveguide is configured to adjust a phase parameter of a corresponding MZI; and
a plurality of beam splitters.

6. The optical computing device of claim 5, wherein waveguides that are in a same MZ interferometer system of the MZ interferometer systems are made of different materials.

7. The optical computing device of claim 1, wherein the parametric oscillator array comprises a plurality of parametric oscillators, and wherein the optical computing device further comprises optical splitters that are coupled to the parametric oscillators, the first feedback system, and the interaction computing array, and wherein each of the optical splitters is configured to:
receive a first optical signal in the first group of optical signals;
split, based on a preset split ratio, the first optical signal into a first part and a second part;
transmit the first part to the first feedback system; and
transmit the second part to the interaction computing array.

8. The optical computing device of claim 1, wherein the parametric oscillator array comprises a plurality of parametric oscillators, and wherein the optical computing device further comprises beam combiners that are coupled to the parametric oscillators, the first feedback system, and the second feedback system, and wherein each of the beam combiners is configured to;
combine a first optical signal in the first group of optical signals with a second optical signal in the second group of optical signals into a third optical signal; and
transmit, to one of the parametric oscillators, the third optical signal.

9. An optical computing chip, comprising:
an optical computing device comprising:
a parametric oscillator array comprising two ends and configured to:
receive a first group of signals; and
generate, based on the first group of signals, a first group of optical signals comprising a plurality of first optical signals;
an interaction computing array coupled to the parametric oscillator array and configured to:
receive the first group of optical signals; and
perform, based on a preset matrix, a first matrix operation on the first group of optical signals to obtain a second group of optical signals that comprises a plurality of second optical signals;
a first feedback system coupled to the two ends and configured to:
receive the first group of optical signals; and
transmit the first group of optical signals to the parametric oscillator array; and
a second feedback system coupled to the parametric oscillator array and the interaction computing array and configured to:
receive the second group of optical signals; and
transmit the second group of optical signals to the parametric oscillator array.

10. The optical computing chip of claim 9, wherein the parametric oscillator array is further configured to:
receive the first group of optical signals and the second group of optical signals; and
output, based on the first group of signals, the first group of optical signals, and the second group of optical signals, a third group of optical signals,
wherein the interaction computing array is further configured to:
receive the third group of optical signals; and
perform, based on the preset matrix, a second matrix operation on the third group of optical signals to obtain a fourth group of optical signals,
wherein the first feedback system is further configured to:
receive the third group of optical signals; and transmit the third group of optical signals to the parametric oscillator array, and wherein the second feedback system is further configured to:
- receive the fourth group of optical signals; and
- transmit the fourth group of optical signals to the parametric oscillator array.

11. The optical computing chip of claim 9, wherein the parametric oscillator array comprises a plurality of parametric oscillators, and wherein each of the parametric oscillators comprises:
- a first waveguide made of a first material having a nonlinear effect; and
- a second waveguide made of a second material that is different than the first material.

12. The optical computing chip of claim 11, wherein the second material has a transmission loss that is less than a threshold.

13. The optical computing chip of claim 9, wherein the interaction computing array comprises a plurality of cascaded Mach-Zehnder interferometer (MI) systems, and wherein each of the cascaded MZI systems comprises:
- a plurality of first MZIs, wherein each of the first MZIs comprises a waveguide comprising a dielectric constant adjustment speed that is less than a threshold, and wherein the waveguide is configured to adjust a phase parameter of a corresponding MZI; and
- a plurality of beam splitters.

14. The optical computing chip of claim 13, wherein waveguides that are in a same MZI system of the MI systems are made of different materials.

15. The optical computing chip of claim 9, wherein the parametric oscillator array comprises a plurality of parametric oscillators, and wherein the optical computing device further comprises optical splitters coupled to the parametric oscillators, the first feedback system, and the interaction computing array, and wherein each of the optical splitters is configured to:
- receive a first optical signal in the first group of optical signals;
- split, based on a preset split ratio, the first optical signal into a first part of optical signal and a second part of optical signal;
- transmit the first part of optical signal to the first feedback system; and
- transmit the second part of optical signal to the interaction computing array.

16. The optical computing chip of claim 9, wherein the parametric oscillator array comprises a plurality of parametric oscillators, and wherein the optical computing device further comprises beam combiners coupled to the parametric oscillators, the first feedback system, and the second feedback system, and wherein each of the beam combiners is configured to:
- combine a first optical signal in the first group of optical signals with a second optical signal in the second group of optical signals into a third optical signal; and
- transmit, to a respective parametric oscillator of the parametric oscillators, the third optical signal.

* * * * *

UNITED STATES PATENT AND TRADEMARK OFFICE
CERTIFICATE OF CORRECTION

| | | |
|---|---|---|
| PATENT NO. | : 12,481,307 B2 | Page 1 of 1 |
| APPLICATION NO. | : 17/827249 | |
| DATED | : November 25, 2025 | |
| INVENTOR(S) | : Xiang Zhang, Zhiqiang Yun and Xiaowen Dong | |

It is certified that error appears in the above-identified patent and that said Letters Patent is hereby corrected as shown below:

In the Claims

Claim 13, Column 19, Line 21: "caded Mach-Zehnder interferometer (MI) systems, and" should read "caded Mach-Zehnder interferometer (MZI) systems, and"

Claim 14, Column 19, Line 30: "waveguides that are in a same MZI system of the MI systems" should read "waveguides that are in a same MZI system of the MZI systems"

Signed and Sealed this
Thirteenth Day of January, 2026

John A. Squires
*Director of the United States Patent and Trademark Office*